(12) United States Patent
Liu

(10) Patent No.: US 8,174,649 B2
(45) Date of Patent: May 8, 2012

(54) LIQUID CRYSTAL DISPLAY AND BIAXIAL COMPENSATION FILM

(75) Inventor: Wei-Chih Liu, Taichung (TW)

(73) Assignees: Taiwan TFT LCD Association, Hsinchu (TW); Chunghwa Picture Tubes, Ltd., Taoyuan (TW); Au Optronics Corporation, Hsinchu (TW); Hannstar Display Corporation, New Taipei (TW); Chi Mei Optoelectronics Corporation, Tainan County (TW); Industrial Technology Research Institute, Hsinchu (TW)

( * ) Notice: Subject to any disclaimer, the term of this patent is extended or adjusted under 35 U.S.C. 154(b) by 301 days.

(21) Appl. No.: 12/582,717

(22) Filed: Oct. 21, 2009

(65) Prior Publication Data
US 2011/0043736 A1 Feb. 24, 2011

(30) Foreign Application Priority Data
Aug. 19, 2009 (TW) ................................ 98127888 A

(51) Int. Cl.
*G02F 1/1335* (2006.01)
(52) U.S. Cl. .......................................................... 349/119
(58) Field of Classification Search ................... 349/119
See application file for complete search history.

(56) References Cited

U.S. PATENT DOCUMENTS
2007/0139771 A1* 6/2007 Wang et al. .................... 359/494
* cited by examiner

*Primary Examiner* — James Dudek
(74) *Attorney, Agent, or Firm* — Jianq Chyun IP Office

(57) ABSTRACT

A liquid crystal display including a liquid crystal panel and a biaxial compensation film is provided. The liquid crystal panel has a first surface and a second surface. The biaxial compensation film is disposed on the first surface and includes a C-plate compensation film and nano-structures on the C-plate compensation film serving as an A-plate compensation film.

25 Claims, 5 Drawing Sheets

LIQUID CRYSTAL DISPLAY AND BIAXIAL COMPENSATION FILM

CROSS-REFERENCE TO RELATED APPLICATION

This application claims the priority benefit of Taiwan application serial no. 98127888, filed on Aug. 19, 2009. The entirety of the above-mentioned patent application is hereby incorporated by reference herein and made a part of specification.

BACKGROUND OF THE INVENTION

1. Field of the Invention

The present invention relates to an optical film. More particularly, the present invention relates to a biaxial compensation film, and a liquid crystal display using the same.

2. Description of Related Art

A liquid crystal display (LCD) is basically consisted of an LCD panel and an upper and a lower polarizers, and a light source thereof is provided by a backlight module. An imaging principle of the LCD is to use an electric field to control orientations of liquid crystal molecules of a liquid crystal layer, so as to influence a polarizing state of a linear polarized light passing through the lower polarizer, and under a function of the upper polarizer, intensity of an emitting light is varied to display bright and dark states to present an image. When the dark state is displayed, a total black state can be viewed from a front viewing angle. Though, when it is viewed from a side viewing angle, since the liquid crystal can cause a phase delay, the light passing through the upper and the lower polarizers cannot be effectively blocks, so that a light leakage phenomenon is generated, and therefore a compensation film is generally used to modify the phase delay effect.

Generally, a present compensation film is mainly attached to an outer surface of the LCD panel according to an outer-attachment method. Since such outer-attached compensation film is fabricated by stretching polymer materials, a thickness thereof is generally more than tens of microns, so that it cannot be fabricated in internal of the LCD panel. Moreover, a small number of compensation films fabricated according to a liquid crystal coating process can be fabricated in the internal of the LCD panel. Though, materials of the compensation films fabricated in the internal of the LCD panel have problems of insufficient heat resistance and high cost, etc.

SUMMARY OF THE INVENTION

The present invention provides a liquid crystal display (LCD) including an LCD panel and a biaxial compensation film. The liquid crystal panel has a first surface and a second surface. The biaxial compensation film is disposed on the first surface and includes a C-plate compensation film and a plurality of nano-structures on the C-plate compensation film serving as an A-plate compensation film.

The present invention provides an LCD including an LCD panel and a biaxial compensation film. The liquid crystal panel includes a first substrate, a second substrate and a liquid crystal layer between the first substrate and the second substrate. The biaxial compensation film is disposed between the liquid crystal layer and the first substrate, and includes a C-plate compensation film and a plurality of nano-structures on the C-plate compensation film serving as an A-plate compensation film.

The present invention provides a biaxial compensation film including a C-plate compensation film and a plurality of nano-structures on the C-plate compensation film. The nano-structures are located on the C-plate compensation film to form an A-plate compensation film.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
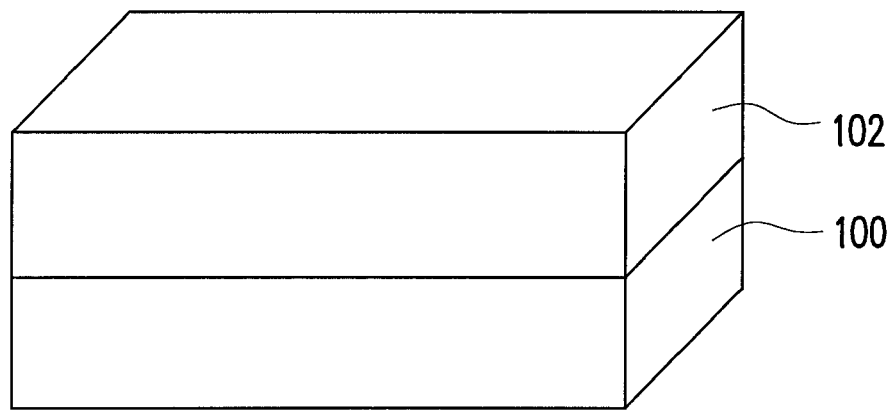
FIG. 1A and FIG. 1B are diagrams illustrating a fabrication process of a biaxial compensation film according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
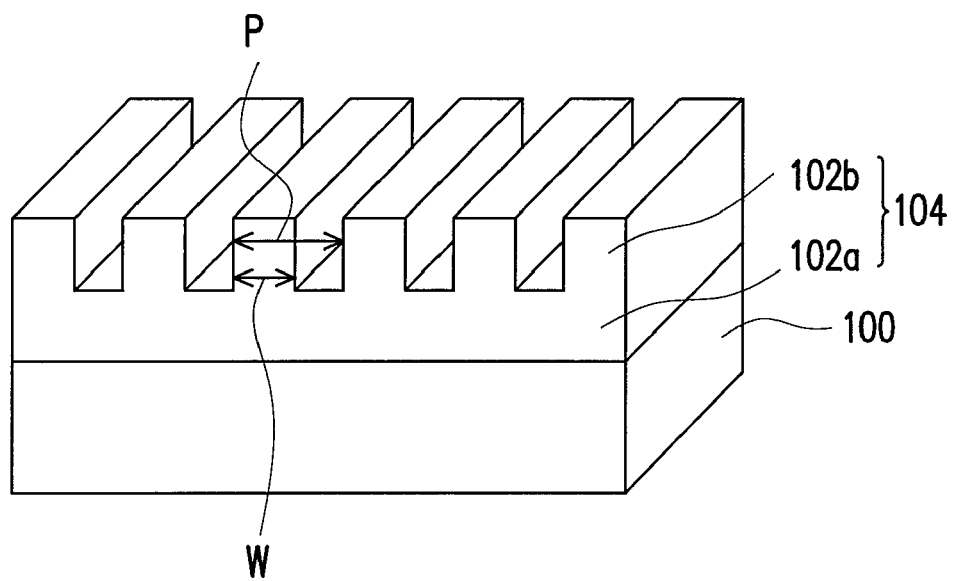

FIG. 1A and FIG. 1B are diagrams illustrating a fabrication process of a biaxial compensation film according to an embodiment of the present invention. Referring to FIG. 1A, a C-plate compensation film 102 is first formed on a substrate 100. The C-plate compensation film is, for example, formed with a coating process, and a material thereof is a polymer material generally used in the C-plate compensation film 102. Moreover, the substrate 100 can be a blank substrate or a substrate having other film layers or devices thereon.

Then, referring to FIG. 1B, a nano-patterning process is performed to the C-plate compensation film 102, wherein the nano-patterning process is performed to a part of the C-plate compensation film 102, so as to reserve another part of the C-plate compensation film 102a located at the bottom. Moreover, a plurality of nano-structures 102b is formed on the C-plate compensation film 102a to serve as an A-plate compensation film. Therefore, the C-plate compensation film 102a and the A-plate compensation film formed by the nano-structures 102b form a biaxial compensation film. The nano-patterning process can be implemented by using laser, ion beam or electron beam. Moreover, the nano-patterning can also be implemented by using a photolithography and etching process or a nano-imprint technique.

In the present embodiment, the formed nano-structures 102b are bar-shape structures, a line width W of each of the nano-structures 102b is less than 200 nanometers, and a cycle (or pitch) P of each of the nano-structures 102b is less than 250 nanometers. Preferably, the line width W of each of the nano-structures 102b is less than 100 nanometers, and the cycle (or pitch) P of each of the nano-structures 102b is less than 150 nanometers. Moreover, the nano-structures 102b are mutually parallel, and an extending direction thereof relates to a polarizing direction of a used polarizer. Value ranges of the cycle P and the line width W of the nano-structures 102b are determined according to a fact that the nano-structures are applied to a liquid crystal display (LCD), though the present invention is not limited thereto, and in other embodiments, the value ranges of the cycle and the line width of the nano-structures can be different.

In the present embodiment, the substrate 100 can be a blank substrate or a substrate already having other film layers or devices thereon. If the substrate 100 is a blank substrate, the biaxial compensation film 104 formed on the blank substrate 100 can be attached on the LCD panel through an outer-attachment method. If the substrate 100 already has other film layers or devices thereon, the biaxial compensation film 104 is an in-cell compensation film fabricated in the LCD panel. Embodiments are provided below to describe the compensation film attached on the LCD panel through the outer-attachment method and the in-cell compensation film fabricated in the LCD panel.

Figure 2:
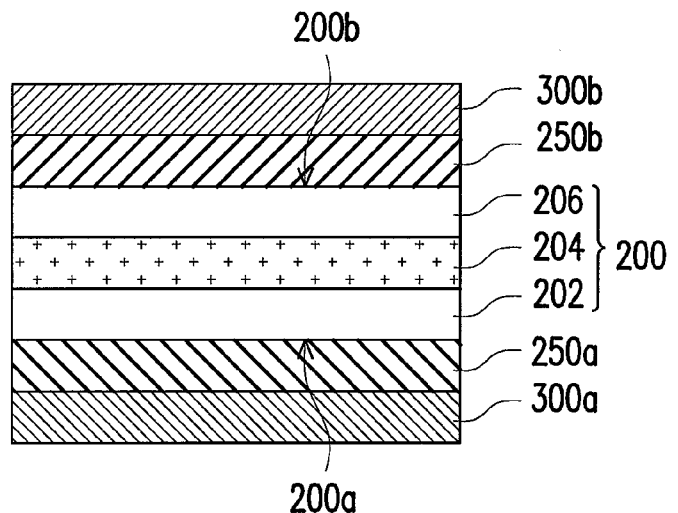
FIGS. 2-11 are cross-sectional views of LCDs according to embodiments of the present invention.

FIG. 2 is a cross-sectional view of an LCD according to an embodiment of the present invention. Referring to FIG. 2, the LCD includes a LCD panel 200, a first biaxial compensation film 250a and a second biaxial compensation film 250b. Preferably, the LCD further includes a first polarizer 300a and a second polarizer 300b. It should be noticed that in some special LCDs, the polarizers are not required, or only one polarizer is disposed on one of the surfaces of the LCD panel. Therefore, in the LCD of the present invention, the polarizers are not necessary or essential components.

The LCD panel 200 has a first surface 200a and a second surface 200b. In detail, the LCD panel 200 includes a first substrate 202, a liquid crystal layer 204 and a second substrate 206. The first surface 200a is an outer surface of the first substrate 202, and the second surface 200b is an outer surface of the second substrate 206. In the present embodiment, the first substrate 202 is an active device array substrate having a pixel array, wherein the pixel array includes a plurality of scan lines, a plurality of data lines, a plurality of thin-film transistors and a plurality of pixel electrodes. The first substrate 202 further includes an alignment layer covering the pixel array. The second substrate 206 is a color filter substrate having a color filter layer and an electrode layer covering the color filter layer. In other embodiments, the second substrate 206 can also be a blank substrate, or can be formed by a blank substrate and an electrode layer covering the bland substrate, and the color filter layer is disposed on the first substrate 202. The second substrate 206 can further include an alignment layer. In the present embodiment, the first substrate 202 is the active device array substrate and the second substrate 206 is the color filter substrate. However, in other embodiments, the first substrate 202 can be a color filter substrate, and the second substrate 206 can be an active device array substrate.

In the present embodiment, the first biaxial compensation film 250a is disposed on the first surface 200a of the LCD panel 200, the second biaxial compensation film 250b is disposed on the second surface 200b of the LCD panel 200. The first biaxial compensation film 250a and the second biaxial compensation film 250b are respectively the biaxial compensation film 104 (formed by the C-plate compensation film 102a and the nano-structures 102b) of FIG. 1, or the substrate 100 of FIG. 1 and the biaxial compensation film 104 on the substrate 100. In other words, the first biaxial compensation film 250a and the second biaxial compensation film 250b can be directly formed on the surfaces of the first substrate 202 and the second substrate 206, and adhesion material or other substrates between the first/the second biaxial compensation film 250a/250b and the first/the second substrate 202/206 is not required. Moreover, the first biaxial compensation film 250a and the second biaxial compensation film 250 can also be disposed on a carrying substrate (for example, the substrate 100 of FIG. 1), and the adhesion material is used to adhere the carrying substrate and the first/the second substrate 202/206.

Moreover, the first polarizer 300a is disposed on the first biaxial compensation film 250a, and the second polarizer 300b is disposed on the second biaxial compensation film 250b. Since the first biaxial compensation film 250a and the second biaxial compensation film 250b are located at outer surfaces of the LCD panel 200 (the first surface 200a and the second surface 200b), the biaxial compensation films of the present embodiment are formed on the surfaces of the LCD panel 200 through the outer-attachment process or a direct coating process.

Figure 3:
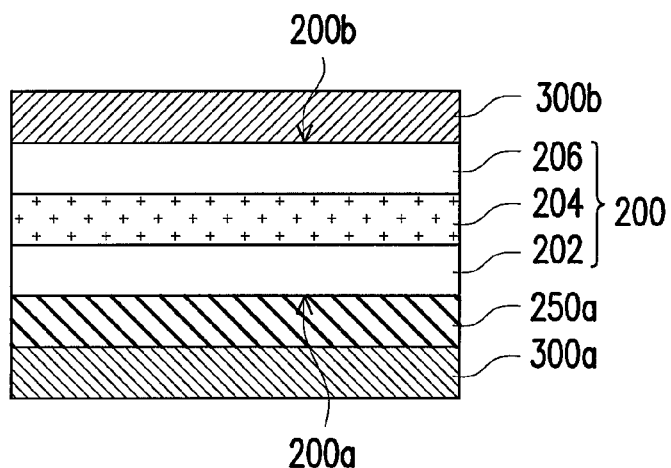
Figure 4:
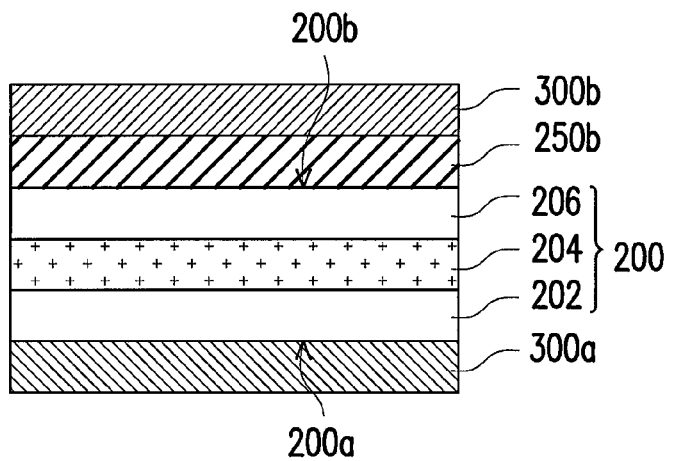

In the embodiment of FIG. 2, the first biaxial compensation film 250a and the second biaxial compensation film 250b are respectively formed on the first surface 200a and the second surface 200b of the LCD panel 200 through the outer-attachment process or the direct coating process. However, in the other embodiments, the biaxial compensation film can be only formed on one of the surfaces of the LCD panel 200 through the outer-attachment or the direct coating process. As shown in FIG. 3 and FIG. 4, the embodiments of FIG. 3 and FIG. 4 are similar to the embodiment of FIG. 2, and a difference there between is that in the embodiment of FIG. 3, the biaxial compensation film 250a is only formed on the first surface 200a of the LCD panel 200 through the outer-attachment or the direct coating process. Moreover, in the embodiment of FIG. 4, the biaxial compensation film 250b is only formed on the second surface 200b of the LCD panel 200 through the outer-attachment or the direct coating process.

Figure 5:
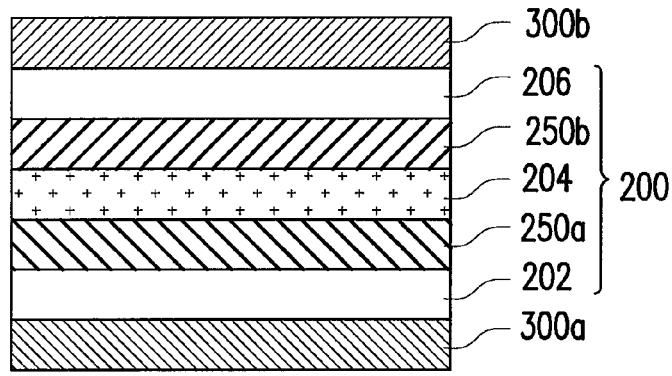

FIG. 5 is a cross-sectional view of an LCD according to an embodiment of the present invention. Referring to FIG. 5, the LCD includes the LCD panel 200, the first polarizer 300a and the second polarizer 300b. Besides the first substrate 202, the second substrate 206 and the liquid crystal layer 204, the LCD panel 200 further includes the first biaxial compensation film 250a and the second biaxial compensation film 250b. In other words, in the embodiment of FIG. 5, the first biaxial compensation film 250a and the second biaxial compensation film 250b are formed in internal of the LCD panel 200.

In detail, the first substrate 202 is an active device array substrate having a pixel array, wherein the pixel array includes a plurality of scan lines, a plurality of data lines, a plurality of thin-film transistors and a plurality of pixel electrodes. The first biaxial compensation film 250a covers the pixel array. Therefore, the first biaxial compensation film 250a is located between the pixel array of the first substrate 202 and the liquid crystal layer 204. In the present embodiment, the first biaxial compensation film 250a is directly formed on the pixel array, so that the first biaxial compensation film 250a is the same to the biaxial compensation film 104 of FIG. 1. Since the first biaxial compensation film 250a is disposed adjacent to the liquid crystal layer 204, and the first biaxial compensation film 250a has the nano-structures serving as the A-plate compensation film, the nano-structures can simultaneously align the liquid crystal molecules in the liquid crystal layer 204. Therefore, the first biaxial compensation film 250a disposed in the LCD panel 200 may have a function of an alignment layer, so that fabrication of the conventional alignment layer can be omitted.

The second substrate 206 is a color filter substrate having a color filter layer and an electrode layer covering the color filter layer. In the other embodiments, the second substrate 206 can also be a blank substrate, or can be formed by a blank substrate and an electrode layer covering the bland substrate, and the color filter layer is disposed on the first substrate 202. The second biaxial compensation film 250b covers the second substrate 206. Therefore, the second biaxial compensation film 250b is located between the second substrate 206 and the liquid crystal layer 204. In the present embodiment, the second biaxial compensation film 250b is directly formed on the second substrate 206, so that the second biaxial compensation film 250b is the same to the biaxial compensation film 104 of FIG. 1. Similarly, since the second biaxial compensation film 250b is disposed adjacent to the liquid crystal layer 204, and the second biaxial compensation film 250b has the nanostructures serving as the A-plate compensation film, the nanostructures can simultaneously align the liquid crystal molecules in the liquid crystal layer 204. Therefore, the second biaxial compensation film 250b disposed in the LCD panel 200 may have the function of the alignment layer, so that fabrication of the conventional alignment layer can be omitted.

Similarly, the LCD can further include the first polarizer 300a and the second polarizer 300b, the first polarizer 300a is disposed on the first surface 200a of the LCD panel 200, and the second polarizer 300b is disposed on the second surface 200b of the LCD panel 200. It should be noticed that in some special LCDs, the polarizers are not required, or only one polarizer is disposed on one of the surfaces of the LCD panel. Therefore, in the LCD of the present invention, the polarizers are not necessary or essential components.

Figure 6:
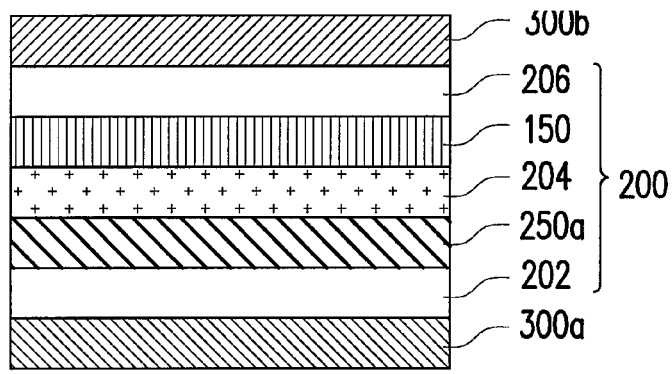
Figure 7:
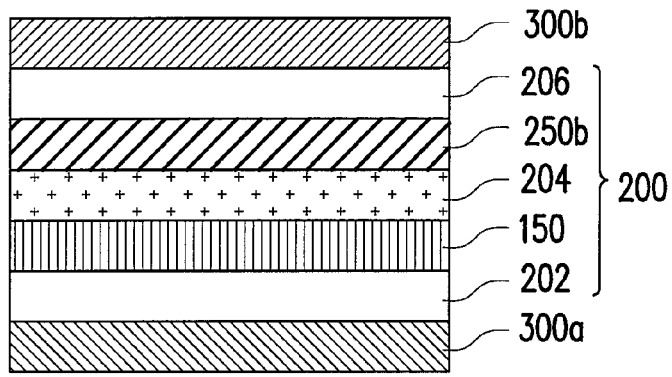

In the embodiment of FIG. 5, the first biaxial compensation film 250a and the second biaxial compensation film 250b are respectively formed on the first substrate 202 and the second substrate 206 of the LCD panel 200. However, in the other embodiments, the biaxial compensation film can be only formed on one of the substrates of the LCD panel 200. As shown in FIG. 6 and FIG. 7, the embodiments of FIG. 6 and FIG. 7 are similar to the embodiment of FIG. 5, and a difference there between is that in the embodiment of FIG. 6, the biaxial compensation film 250a is only formed on the first substrate 202 of the LCD panel 200, and the biaxial compensation film 250a can serve as an alignment layer of the first substrate 202, so that another conventional alignment layer 150 can be formed on the second substrate 206. Moreover, in the embodiment of FIG. 7, the biaxial compensation film 250b is only formed on the second substrate 206 of the LCD panel 200, and the biaxial compensation film 250b can serve as an alignment layer of the second substrate 206, so that another conventional alignment layer 150 can be formed on the first substrate 202.

Figure 8:
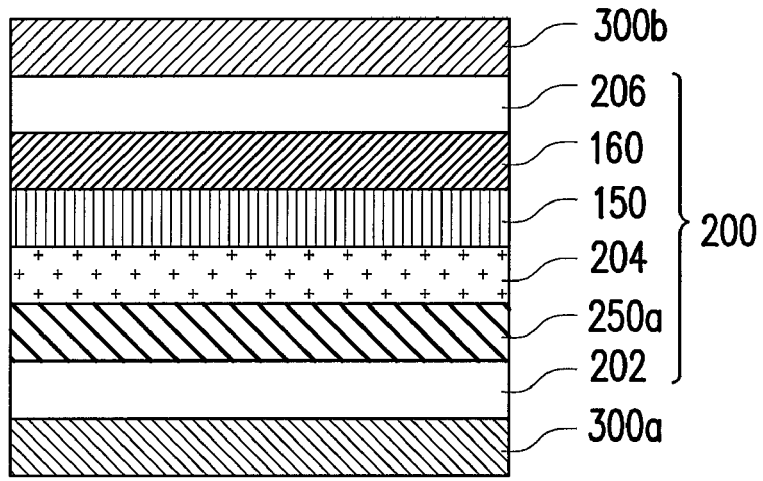

FIG. 8 is a cross-sectional view of an LCD according to an embodiment of the present invention. The embodiment of FIG. 8 is similar to the embodiment of FIG. 6, namely, only the first biaxial compensation film 250a is disposed on the first substrate 202, and the alignment layer 150 is disposed on the second substrate 206. A difference between the embodiments of FIG. 8 and FIG. 6 is that in the embodiment of FIG. 8, a conventional compensation film 160 is further disposed on the second substrate 206, and the conventional compensation film 160 is located between the alignment layer 150 and the second substrate 206. In other words, in the embodiment of FIG. 8, the axial compensation film 250a having the alignment function is disposed on the first substrate 202, and the conventional alignment layer and the conventional compensation film are disposed on the second substrate 206.

Figure 9:
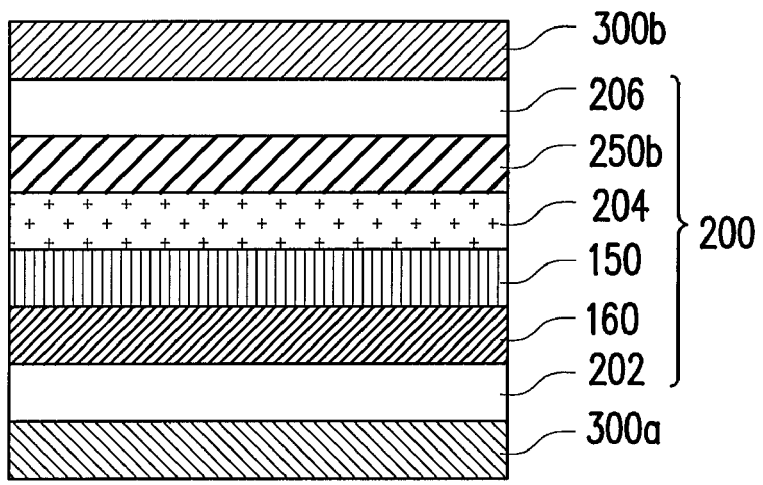

FIG. 9 is a cross-sectional view of an LCD according to an embodiment of the present invention. The embodiment of FIG. 9 is similar to the embodiment of FIG. 7, namely, only the second biaxial compensation film 250b is disposed on the second substrate 206, and the alignment layer 150 is disposed on the first substrate 202. A difference between the embodiments of FIG. 9 and FIG. 7 is that in the embodiment of FIG. 9, the conventional compensation film 160 is further disposed on the first substrate 202, and the conventional compensation film 160 is located between the alignment layer 150 and the first substrate 202. In other words, in the embodiment of FIG. 9, the biaxial compensation film 250b having the alignment function is disposed on the second substrate 206, and the conventional alignment layer and the conventional compensation film are disposed on the first substrate 202.

In the embodiments of FIG. 2 to FIG. 4, the biaxial compensation films of the present invention are formed on the outer surfaces of the LCD panel through the outer-attachment process or the direct coating process. Moreover, in the embodiments of FIG. 5 to FIG. 9, the biaxial compensation films of the present invention are fabricated in the internal of the LCD panel 200. However, the present invention is not limited to the above embodiments, and in the other embodiments, the outer-attachment process or the direct coating process and the process of fabricating the biaxial compensation films in the internal of the LCD panel can be combined, which is described as follows.

Figure 10:
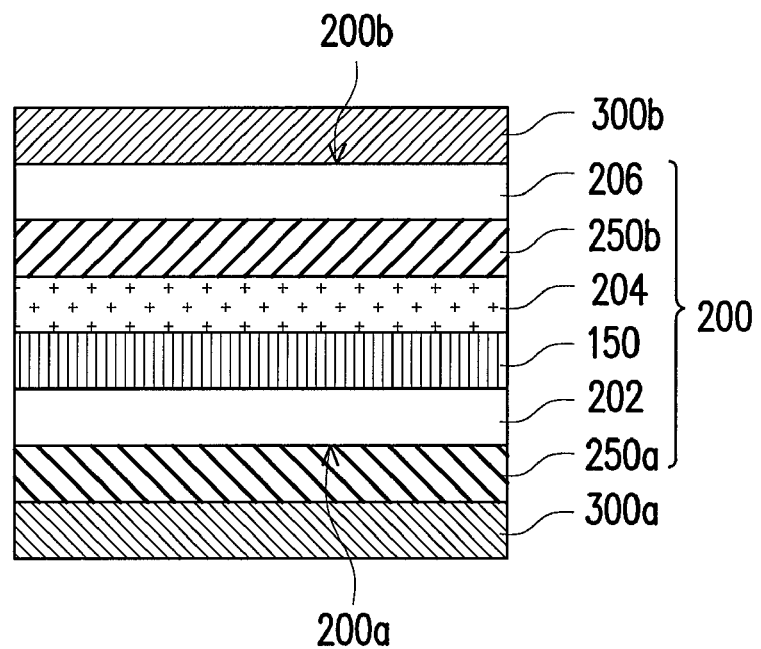

FIG. 10 is a cross-sectional view of an LCD panel according to an embodiment of the present invention. Referring to FIG. 10, in the embodiment of FIG. 10, the first biaxial compensation film 250a is disposed on the first surface 200a of the LCD panel 200, and the second biaxial compensation film 250b is disposed between the second substrate 206 and the liquid crystal layer 204. In other words, the first biaxial compensation film 250a is formed on the outer surface of the LCD panel 200 through the outer-attachment process or the direct coating process, and the second biaxial compensation film 250b is fabricated in the internal of the LCD panel 200. Since the second biaxial compensation film 250b is fabricated in the internal of the LCD panel 200, and is located adjacent to the liquid crystal layer 204, the second compensation film 250b can serve as the alignment layer of the second substrate 206. However, since the first biaxial compensation film 250a is formed on the outer surface of the first substrate 202 of the LCD panel 200 through the outer-attachment process or the direct coating process, a conventional alignment layer 150 can be additionally disposed between the first substrate 202 and the liquid crystal layer 204. Similarly, in the present embodiment, the LCD can further includes the first polarizer 300a and the second polarizer 300b, wherein the first polarizer 300a is disposed on the first biaxial compensation film 250a, and the second polarizer 300b is disposed on the second surface 200b of the LCD panel 200 (the surface of the second substrate 206).

Figure 11:
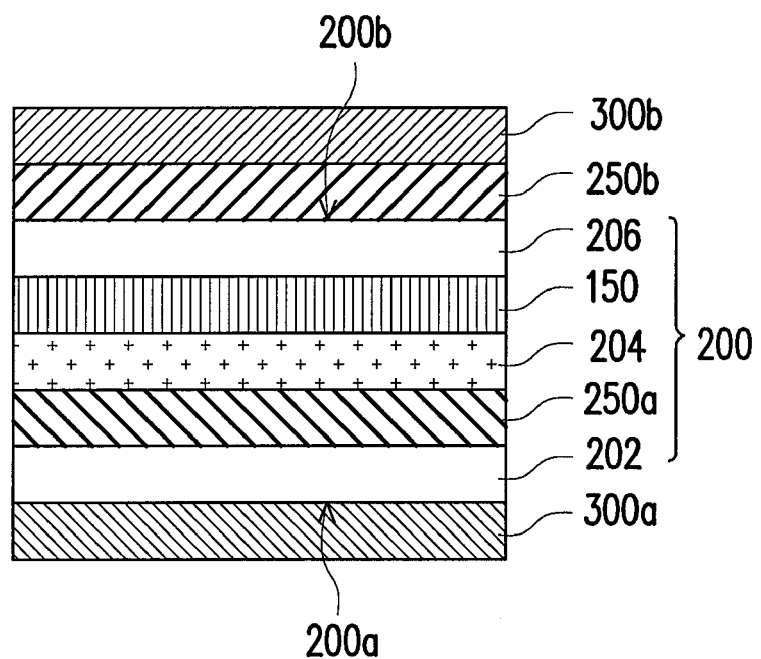

FIG. 11 is a cross-sectional view of an LCD panel according to an embodiment of the present invention. Referring to FIG. 11, in the embodiment of FIG. 11, the first biaxial compensation film 250a is disposed between the first substrate 202 and the liquid crystal layer 204, and the second biaxial compensation film 250b is disposed on the second surface 200b of the LCD panel 200. In other words, the first biaxial compensation film 250a is fabricated in the internal of the LCD panel 200, and the second biaxial compensation film 250b is formed on the outer surface of the LCD panel 200 through the outer-attachment process or the direct coating process. Since the first biaxial compensation film 250a is fabricated in the internal of the LCD panel 200, and is located adjacent to the liquid crystal layer 204, the first compensation film 250a can serve as the alignment layer of the first substrate 202. However, since the second biaxial compensation film 250b is formed on the outer surface of the second substrate 206 of the LCD panel 200 through the outer-attachment process or the direct coating process, a conventional alignment layer 150 can be additionally disposed between the second substrate 206 and the liquid crystal layer 204. Similarly, in the present embodiment, the LCD can further includes the first polarizer 300a and the second polarizer 300b, wherein the first polarizer 300a is disposed on the first surface 200a of the LCD panel 200 (the surface of the first substrate 202), and the second polarizer 300b is disposed on the second biaxial compensation film 250b.

In summary, the biaxial compensation film of the present invention includes the C-plate compensation film and a plurality of the nano-structures on the C-plate compensation film serving as the A-plate compensation film. Since the biaxial compensation film can be fabricated by a heat-resistant material with a low cost, it can be fabricated in internal of the LCD panel. Certainly, the biaxial compensation film can also be formed on the outer surface of the LCD panel through the outer-attachment process or the direct coating process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD), comprising:
   an LCD panel, having a first surface and a second surface; and
   a first biaxial compensation film, disposed on the first surface of the LCD panel and comprising a first C-plate compensation film and a plurality of first nano-structures on the first C-plate compensation film serving as a first A-plate compensation film, wherein the first nano-structures of the first A-plate compensation film contacts with the first C-plate compensation film, and a material of the first nano-structures of the first A-plate compensation film is the same to a material of the first C-plate compensation film.

2. The LCD as claimed in claim 1, wherein a line width of each of the first nano-structures is less than 200 nanometers, and a cycle of each of the first nano-structures is less than 250 nanometers.

3. The LCD as claimed in claim 1, wherein a line width of each of the first nano-structures is less than 100 nanometers, and a cycle of each of the first nano-structures is less than 150 nanometers.

4. The LCD as claimed in claim 1, further comprising:
   a first polarizer, located on the first biaxial compensation film; and
   a second polarizer, located on the second surface of the LCD panel.

5. The LCD as claimed in claim 1, further comprising a second compensation film located on the second surface of the LCD panel, wherein the second biaxial compensation film comprises a second C-plate compensation film and a plurality of second nano-structures on the second C-plate compensation film serving as a second A-plate compensation film.

6. The LCD as claimed in claim 4, wherein a line width of each of the second nano-structures is less than 200 nanometers, and a cycle of each of the second nano-structures is less than 250 nanometers.

7. The LCD as claimed in claim 4, wherein a line width of each of the second nano-structures is less than 100 nanometers, and a cycle of each of the second nano-structures is less than 150 nanometers.

8. The LCD as claimed in claim 1, wherein the LCD panel comprises:
   a first substrate;
   a second substrate; and
   a liquid crystal layer, located between the first substrate and the second substrate, wherein the first biaxial compensation film is located on a surface of the first substrate.

9. The LCD as claimed in claim 8, further comprising a second compensation film located between the liquid crystal layer and the second substrate, wherein the second biaxial compensation film comprises a second C-plate compensation film and a plurality of second nano-structures on the second C-plate compensation film serving as a second A-plate compensation film.

10. The LCD as claimed in claim 9, wherein a linewidth of each of the second nano-structures is less than 200 nanometers, and a cycle of each of the second nano-structures is less than 250 nanometers.

11. The LCD as claimed in claim 9, further comprising an alignment layer located between the first substrate and the liquid crystal layer.

12. The LCD as claimed in claim 1, wherein one of the first substrate and the second substrate is an active device array substrate, and another one of the first substrate and the second substrate is a color filter array substrate.

13. A liquid crystal display (LCD), comprising:
   an LCD panel, comprising a first substrate, a second substrate and a liquid crystal layer between the first substrate and the second substrate; and
   a first biaxial compensation film, disposed between the liquid crystal layer and the first substrate, and comprising a first C-plate compensation film and a plurality of first nano-structures on the first C-plate compensation film serving as a first A-plate compensation film, wherein the first nano-structures of the first A-plate compensation film contacts with the first C-plate compensation film, and a material of the first nano-structures of the first A-plate compensation film is the same to a material of the first C-plate compensation film.

14. The LCD as claimed in claim 13, wherein a line width of each of the first nano-structures is less than 200 nanometers, and a cycle of each of the first nano-structures is less than 250 nanometers.

15. The LCD as claimed in claim 13, wherein a line width of each of the first nano-structures is less than 100 nanometers, and a cycle of each of the first nano-structures is less than 150 nanometers.

16. The LCD as claimed in claim 13, further comprising:
   a first polarizer, located on a surface of the first substrate; and
   a second polarizer, located on a surface of the second substrate.

17. The LCD as claimed in claim 13, further comprising a second compensation film located between the liquid crystal layer and the second substrate, wherein the second biaxial compensation film comprises a second C-plate compensation film and a plurality of second nano-structures on the second C-plate compensation film serving as a second A-plate compensation film.

18. The LCD as claimed in claim 17, wherein a line width of each of the second nano-structures is less than 200 nanometers, and a cycle of each of the second nano-structures is less than 250 nanometers.

19. The LCD as claimed in claim 17, wherein a line width of each of the second nano-structures is less than 100 nanometers, and a cycle of each of the second nano-structures is less than 150 nanometers.

20. The LCD as claimed in claim 13, further comprising an alignment layer located between the liquid crystal layer and the second substrate.

21. The LCD as claimed in claim 13, further comprising:
an alignment layer, located between the liquid crystal layer and the second substrate; and
a compensation film, located between the alignment layer and the second substrate.

22. A biaxial compensation film, comprising:
a C-plate compensation film; and
a plurality of nano-structures, located on the C-plate compensation film to form an A-plate compensation film, wherein the nano-structures of the A-plate compensation film contacts with the C-plate compensation film, and a material of the nano-structures of the A-plate compensation film is the same to a material of the C-plate compensation film.

23. The biaxial compensation film as claimed in claim 22, wherein a line width of each of the nano-structures is less than 200 nanometers, and a cycle of each of the nano-structures is less than 250 nanometers.

24. The biaxial compensation film as claimed in claim 22, wherein a material of the C-plate compensation film is the same to a material of the nano-structures.

25. The biaxial compensation film as claimed in claim 22, wherein a line width of each of the nano-structures is less than 100 nanometers, and a cycle of each of the nano-structures is less than 150 nanometers.

* * * * *